E. A. ILLIG.
AUTO TIRE.
APPLICATION FILED FEB. 3, 1916.
1,187,624.
Patented June 20, 1916.
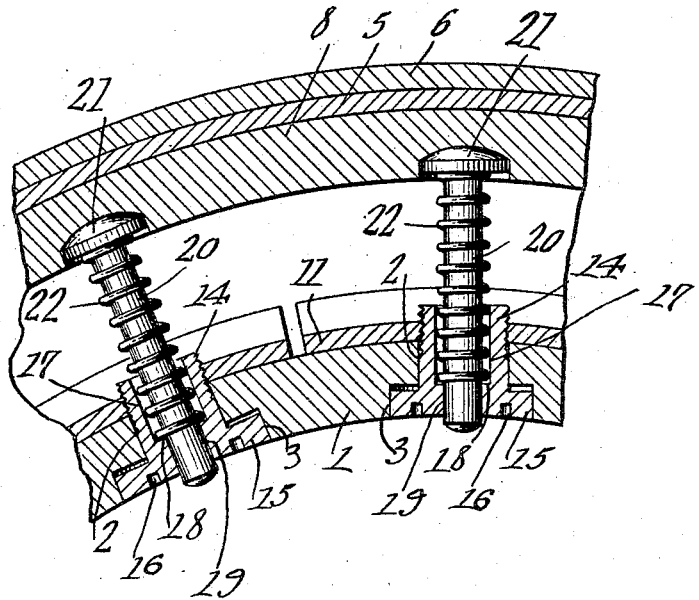
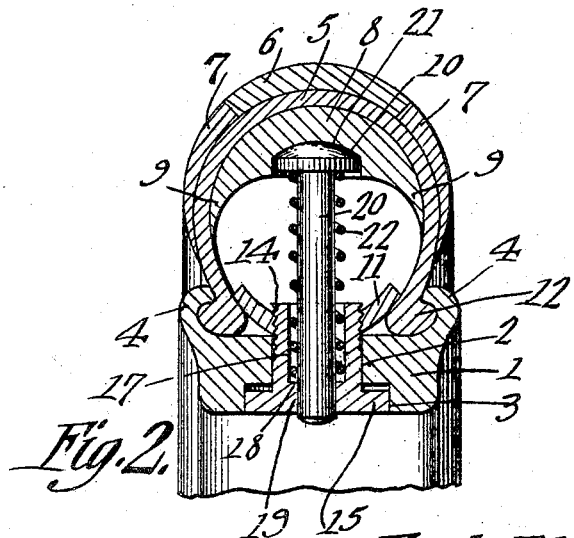
Witnesses
E. A. Illig
Inventor
by
Attorneys

UNITED STATES PATENT OFFICE.

EDWARD A. ILLIG, OF ERIE, PENNSYLVANIA, ASSIGNOR TO EDWARD F. SHUGART, OF ERIE, PENNSYLVANIA.

AUTO-TIRE.

1,187,624.         Specification of Letters Patent.     Patented June 20, 1916.

Application filed February 3, 1916. Serial No. 76,000.

*To all whom it may concern:*

Be it known that I, EDWARD A. ILLIG, a citizen of the United States, residing at Erie, in the county of Erie and State of Pennsylvania, have invented a new and useful Auto-Tire, of which the following is a specification.

The device forming the subject matter of this application is a vehicle tire, and one object of the present invention is to provide novel means for supporting the tread portion of the tire yieldingly and adjustably, and for causing the longitudinal edges of the tire to coact with the rim.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawing: Figure 1 shows in longitudinal section, a wheel rim and tire embodying the present invention; Fig. 2 is a cross section of the structure shown in Fig. 1.

In carrying out the present invention there is provided a rim 1 ordinarily but not necessarily fashioned from wood. The rim 1 is equipped with circumferential spaced passages 2 opening at their inner ends into enlarged recesses 3. Any suitable means may be provided for assembling the tire, hereinafter described, with the rim 1, but in the present instance, the rim is equipped with clencher flanges 4 adapted to coact with clencher beads 12 on the tire.

The tire includes a canvas body 5, a rubber fiber tread 6, rubber side strips 7 secured to the tread 6 and to the body 5, and a rubber inner strip 8 secured to the body 5, the strip 8 being of considerable thickness adjacent the tread of the tire, and tapering toward its side edges as shown at 9. Generally considered, however, the tire may be made from any desired materials. In the inner face of the strip 8, circular seats 10 are formed, the outer walls of the seats preferably being convexed outwardly, as clearly shown in Fig. 2. A sectional metal retaining strip 11 which is trough-shaped in cross section bears against the beads 12 of the tire to hold the same engaged with the flanges 4, the strip 11 abutting along its longitudinal center against the outer face of the rim 1.

The invention comprises a plurality of adjusting members each embodying a neck 14 rotatable in the passage 2 of the rim 1 and threaded into the retaining strip 11, each adjusting member including a head 15 mounted to rotate in the recess 3 of the rim 1, the head 15 of the adjusting members being provided, if desired, with openings 16 adapted to receive a spanner wrench whereby the adjusting member may be rotated. Each adjusting member is provided with an axial opening 17, decreased in diameter intermediate its ends to form a shoulder 18, the reduced portion of the opening being indicated at 19.

Mounted to slide in the reduced portion 19 of the opening in each adjusting member is a support 20, ordinarily in the form of a rigid rod which is circular in cross section, the support 20 embodying a head 21 abutting against the inner strip 8 of the tire within the contour of the seat 10 therein. A compression spring surrounds each support 20, the outer end of the spring abutting against the head 21. The inner end of each spring 22 is received within the enlarged portion of the opening 17 in the adjusting member and abuts against the shoulder 18.

In practical operation, when the adjusting members are rotated, the adjusting members will be advanced, because they are threaded into the strip 11. When the adjusting members thus are advanced, the springs 22 will be compressed. At the same time, the retaining strip 11 will be retracted and will be caused to bind tightly against the beads 12 and to bind against the rim 1 owing to the function exercised by the heads 15 of the adjusting members.

It is to be observed that the inner end of the support 20 is accessible through the opening 19 in the adjusting member 14—15, whereby the support may be moved outwardly to relieve the compressive effort of the spring 22 on the shoulder 18 of the adjusting member. Because this operation is possible, the adjusting member may be unscrewed more readily than would be possible otherwise.

Having thus described the invention, what is claimed is:—

In a device of the class described, a rim; a tire having its longitudinal edges engaged with the rim; adjusting members each including, in a one piece structure, a shank movable in the rim, and an enlarged head coacting with the inner portion of the rim, each adjusting member having an opening extended entirely therethrough, the opening comprising large and small portions defining an internal shoulder; a sectional retaining strip engaging the longitudinal edges of the tire, the shank of each adjusting member being threaded into the strip; a support slidable in the small portion of the opening in the adjusting member and provided at its outer end with a head coacting with the tire; and a compression spring surrounding a portion of each support, the outer end of the spring abutting against the head, the inner end of the spring being received in the large portion of the opening and abutting against the shoulder; the inner end of the support being accessible through the opening in the adjusting member whereby the support may be moved outwardly to relieve the compressive effort of the spring on the shoulder, thereby facilitating an unscrewing of the adjusting member.

In testimony that I claim the foregoing as my own, I have hereto affixed my signature in the presence of two witnesses.

EDWARD A. ILLIG.

Witnesses:
Z. M. Cass,
R. J. Fitz Gerald.

Copies of this patent may be obtained for five cents each, by addressing the "Commissioner of Patents, Washington, D. C."